United States Patent
Bourg

[15] 3,696,752
[45] Oct. 10, 1972

[54] CONVEYOR SYSTEM
[72] Inventor: Michel Bourg, Neuilly S/Seine, France
[73] Assignee: Frankel-Industries, Seine and Marne, France
[22] Filed: Sept. 12, 1969
[21] Appl. No.: 857,378

[52] U.S. Cl. ............ 104/148 LM, 104/89, 104/94, 105/49, 105/150
[51] Int. Cl. .................... B60l 9/00, B60m 1/30
[58] Field of Search ..... 104/89, 96, 93, 148, 148 LM, 104/94; 105/49, 4, 150, 153

[56] References Cited

UNITED STATES PATENTS

| 1,126,608 | 1/1915 | Woodruff | 104/148 LM |
| 2,958,743 | 11/1960 | Moore | 104/93 |
| 3,233,559 | 2/1966 | Smith et al. | 104/148 LM |
| 3,332,360 | 7/1967 | Leach | 104/96 |
| 3,352,254 | 11/1967 | Lauber | 105/4 |

Primary Examiner—Drayton E. Hoffman
Attorney—Woodhams, Blanchard and Flynn

[57] ABSTRACT

A conveyor system having tracks supporting a carriage having two spaced and wheeled units, each unit including a linear motor, at least one motor being connected at all times to a source of electrical potential.

3 Claims, 3 Drawing Figures

PATENTED OCT 10 1972

3,696,752

INVENTOR
MICHEL BOURG
BY
Woodhams, Blanchard & Flynn
ATTORNEYS

CONVEYOR SYSTEM

The present invention concerns electrified conveyors comprised of self-propelled carriages supported by rails. These carriages may be suspended from elevated rails or they can roll on rails placed on the ground, and they can be equipped with rotating electric motors, which are furnished with brushes slideably engaged with collector bars extending along the rails, or with linear motors, the installation including a conductive plate generally made of copper or aluminum, which serves as an induced or secondary element and which extends lengthwise along the rails or track.

Most of the time, all such conveyors include a system of tracks with, obviously, some switch devices, some intersections, transfers from one conveyor to another, etc., which necessitate at least some opening in the collector bar of supply, or in the secondary plate of the linear motor. These openings pose some problems in the continuous operation of the motors.

The object of the invention is to provide conveyors of the type in question in which these problems are overcome by means of a novel concept of assembly.

In accomplishing the purposes of the invention, the motors are grouped in twos and united by their frames, said motors being spaced from each other lengthwise of the track, the length of the space being at least equal to the longest opening in the collector bars, and in the plate of the secondary in the case of conveyors with linear motors.

In a model of the preferred embodiment, two motor units are carried, respectively, by two distinct structures joined by a connecting means, it being understood that the invention also covers the case of two motor units mounted on a single carriage.

Preferably, each motor has a power equal to half of that which it would normally have in a conveyor comprised of individual and independent carriages, each with a single motor, which manifests itself by a slowing up of the conveyor in the zone of an opening, such as that caused by a switch device or an intersection, a condition favorable to the good functioning of the assembly.

The invention will be better understood after reading the following description and examining the accompanying drawings which show, by way of example, only an embodiment of a conveyor according to the invention.

Figure 1:
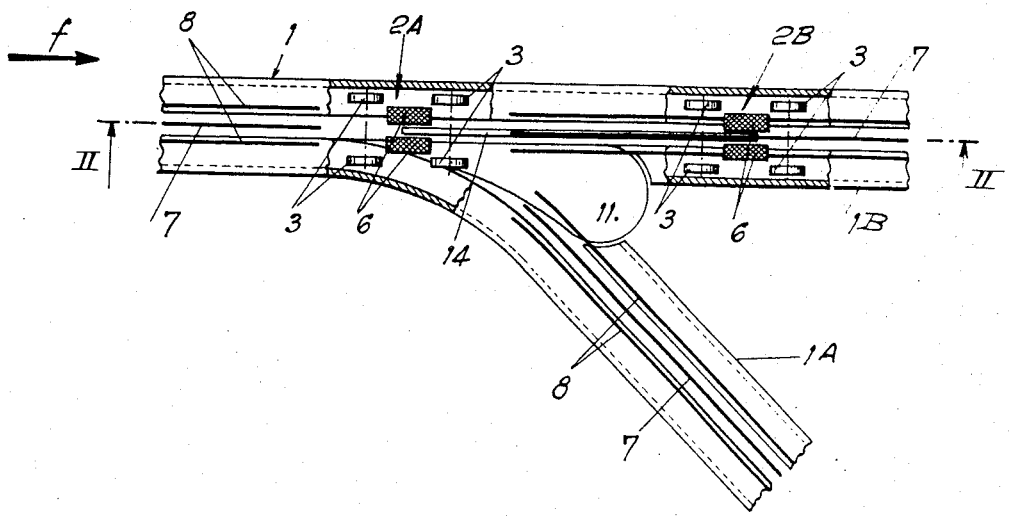
FIG. 1 is a plan view of a conveyor having a linear motor according to the invention and located in the zone of a switch.
Figure 3:
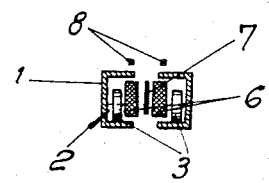
FIG. 3 is a sectional view taken along the line III—III in FIG. 2.

The conveyor partially illustrated in FIG. 1 comprises a system of tracks, such as tracks 1, 1A and 1B, each track having a rectangular cross section, as shown in FIG. 3.

A carriage 2 is supported upon said tracks for movement lengthwise thereof. Said carriage 2 is comprised of a pair of wheeled units 2A and 2B, each of which is provided with four wheels 3 which are supported within, or for movement along, the tracks 1, 1A or 1B. Said tracks are each comprised of a pair of spaced, elongated and channel-shaped members which open toward each other. Each carriage unit is driven lengthwise of the track by a linear motor, the inductors 6 of which are supported between said wheels. Each of the said motors has two inductors 6 and an armature or secondary which is comprised of a central conducting element 7 secured in position between the two channel-shaped members of the track.

Figure 2:
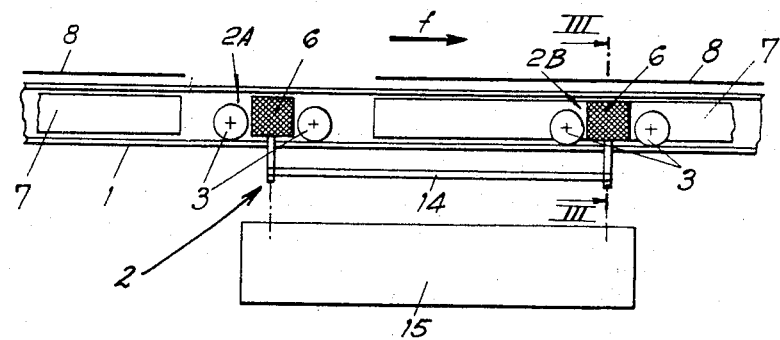
FIG. 2 is a vertical, cross-sectional view taken along the line II—II in FIG. 1.

The inductors 6 of the motors are primary elements and are provided with means including a set of brushes of any conventional type (not shown) which slide on collector bars 8. The entire system includes switch devices and track intersections so that the collector bars 8 and the secondary conductor 7 have breaks or interruptions in these zones of the switches or the intersections, as is shown in FIG. 1. A switch, which is shown in its entirety at 11, permits the carriage to move in the direction of the arrow $f$ passing from track 1 to track 1A or to track 1B. As seen in FIGS. 1 and 2, the length (longitudinally of the track) of the inductor 6 of the motors is substantially less than the length of the breaks in the bars 8 and secondary conductors 7.

In order to provide for continuous operation of the conveyor when the carriage passes the zones of current interruption, for example in the zone of switch 11, the carriage is comprised of two units 2A and 2B, the frames of which are secured to the opposite ends of an articulated connecting bar 14. A load 15 is suspended from the carriage in FIG. 2.

The length of the connecting bar 14 is greater than the longest opening or interruption in the collector bars 8 or the secondary conductor 7. Accordingly, when the carriage passes a zone of current interruption such as that of a switch 11, at least one motor of each carriage always remains in normal functioning condition. That is, one of the motors in each carriage thus assures, by means of the connecting bar 14, the movement of the unit which carries the other motor while this latter unit is precisely in the zone of the current interruption.

Advantageously, each of these two motors will have a power equal to half of that which one obtains from the motor which is provided in existing carriages of the kind that have just one motor per carriage. Thus, in all of the normal uses of the above-described system, each carriage is equipped with two motors having a total power equal to the power of the motors used in conventional conveyors. Accordingly, when the carriage passes the zones of current interruption, there will be a continuous, satisfactory operation of the conveyor. Furthermore, the invention is not limited to the embodiment described above, which has been described for example only. It will be apparent that other modifications come within the scope of the invention.

The embodiments of the invention in which an exclusive property or privilege is claimed are defined as follows:

1. A conveyor system, comprising in combination:
a track;
a carriage arranged for movement along said track;
electrical motive power means for moving said carriage along said track, said motive power means including a strip extending along the length of said track, said strip having at least one break therein, each break defining a longitudinal open space between two segments of said strip, said motive power means further including a pair of motor elements, said motor elements each being of length substantially less than the length of said break, each motor element being coacting electrically with said strip when opposed thereto for moving said carriage along said track but being de-energized when opposed to said break, said motor elements being carried by said carriage and being spaced longitudinally of said carriage, said spacing being at least as great as the length of said open space between said strip segments, said motor elements being alternatively de-energized as said carriage advances past said open space between said strip segments so that at least one of said motor elements is energized at any moment during such advancement, said motor elements being of substantially equal power so that said carriage will be driven at substantially half power when one of said motor elements is not energized and the carriage will be continuously driven but at reduced power as it advances past said open space between said strip segments;

whereby at all times at least one of said motor elements on said carriage will be in opposed electrically coacting relationship with said strip so as to maintain continuous powered movement of said carriage as said carriage moves past said break in said strip.

2. A conveyor according to claim 1, characterized in that two said motor elements are of the linear type and they are carried by two separate units connected by an articulated bar.

3. An electrified conveyor system, comprising in combination:

track means including first, second and third tracks radiating from a central zone and track switch means in said central zone for joining said first track alternatively to said second and third tracks;

first, second and third electric power supply strips extending along said first, second and third tracks, respectively, and ending adjacent said central zone, the end of said first strip being spaced from the adjacent ends of said second and third strips by at least a portion of said switch means and at a fixed distance;

first, second and third secondary conductors extending along said first, second and third tracks, respectively, and ending adjacent said central zone, the end of said first conductor being spaced from the ends of said second and third conductors by at least a portion of said switch means and at a fixed separation;

conveyor carriage means capable of pendently supporting a load and movable along said first track and onto and along the one of said second and third tracks selected by said switch means, said carriage means comprising spaced first and second wheeled units connected by an articulated bar and engageable with said track means for supporting said carriage means for movement therealong, said first and second wheeled units each being shorter longitudinally of the track means than the spacings between said strips and between said secondary conductors, said carriage means further comprising first and second electric linear motors, said first and second motors being carried by said first and second wheeled units, respectively, for driving same along said track means, each motor being independently energizable from the opposed portion of the adjacent one of said strips and electrically coacting with the opposed portion of the adjacent one of said conductors, said first and second motors being alternatively deenergized as said carriage means advances from said first track past said switch means and onto the selected one of said second and third tracks, the spacing of said wheeled units exceeding said fixed distance between said first strip and said second and third strips and said fixed separation between said first conductor and said second and third conductors so that at least one of said motors is energized at any moment during such advancement, said motors being of substantially equal power so that said carriage means will be driven at substantially half power when one of said motors is not energized, whereby said carriage means is continuously driven but at reduced power as it advances past said switch means.

* * * * *